United States Patent [19]
Miyamoto et al.

[11] Patent Number: 5,059,793
[45] Date of Patent: Oct. 22, 1991

[54] SCANNING TUNNELING MICROSCOPE HAVING PROPER SERVO CONTROL FUNCTION

[75] Inventors: Hirofumi Miyamoto; Takao Okada; Tsugiko Takase; Shuzo Mishima; Hiroko Ota, all of Hachioji, Japan

[73] Assignee: Olympus Optical Co., Ltd., Tokyo, Japan

[21] Appl. No.: 591,457

[22] Filed: Oct. 1, 1990

[30] Foreign Application Priority Data

Oct. 4, 1989 [JP] Japan .................................. 1-259617
Oct. 4, 1989 [JP] Japan .................................. 1-259618

[51] Int. Cl.⁵ ............................................ H01J 37/26
[52] U.S. Cl. ..................................... 250/306; 250/307
[58] Field of Search ................................ 250/306, 307

[56] References Cited
U.S. PATENT DOCUMENTS 4,343,993  8/1982  Binnig et al. .......................... 250/306
4,665,313  5/1989  Wells .................................... 250/306
4,870,352  9/1989  Koechner ............................. 250/306

OTHER PUBLICATIONS
Rev. Sci. Instrum. 57(3), Mar. 1986.

Primary Examiner—Jack I. Berman
Attorney, Agent, or Firm—Frishauf, Holtz, Goodman & Woodward

[57] ABSTRACT

A scanning tunneling microscope includes a piezoelectric driver expanding and contracting according to a voltage applied thereto to adjust the distance between a sample and a probe. A servo circuit outputs a servo voltage to control the expansion and contraction of the piezoelectric driver to keep a tunnel current flowing between the sample and the probe at a constant value. A correction voltage generating circuit generates a given correction voltage to correct a voltage to be applied to the piezoelectric driver. An adding circuit adds the servo voltage and the correction voltage together and supplies an added output to the piezoelectric driver. A control circuit controls the correction voltage according to the servo voltage to set the added output to a given reference voltage.

12 Claims, 11 Drawing Sheets

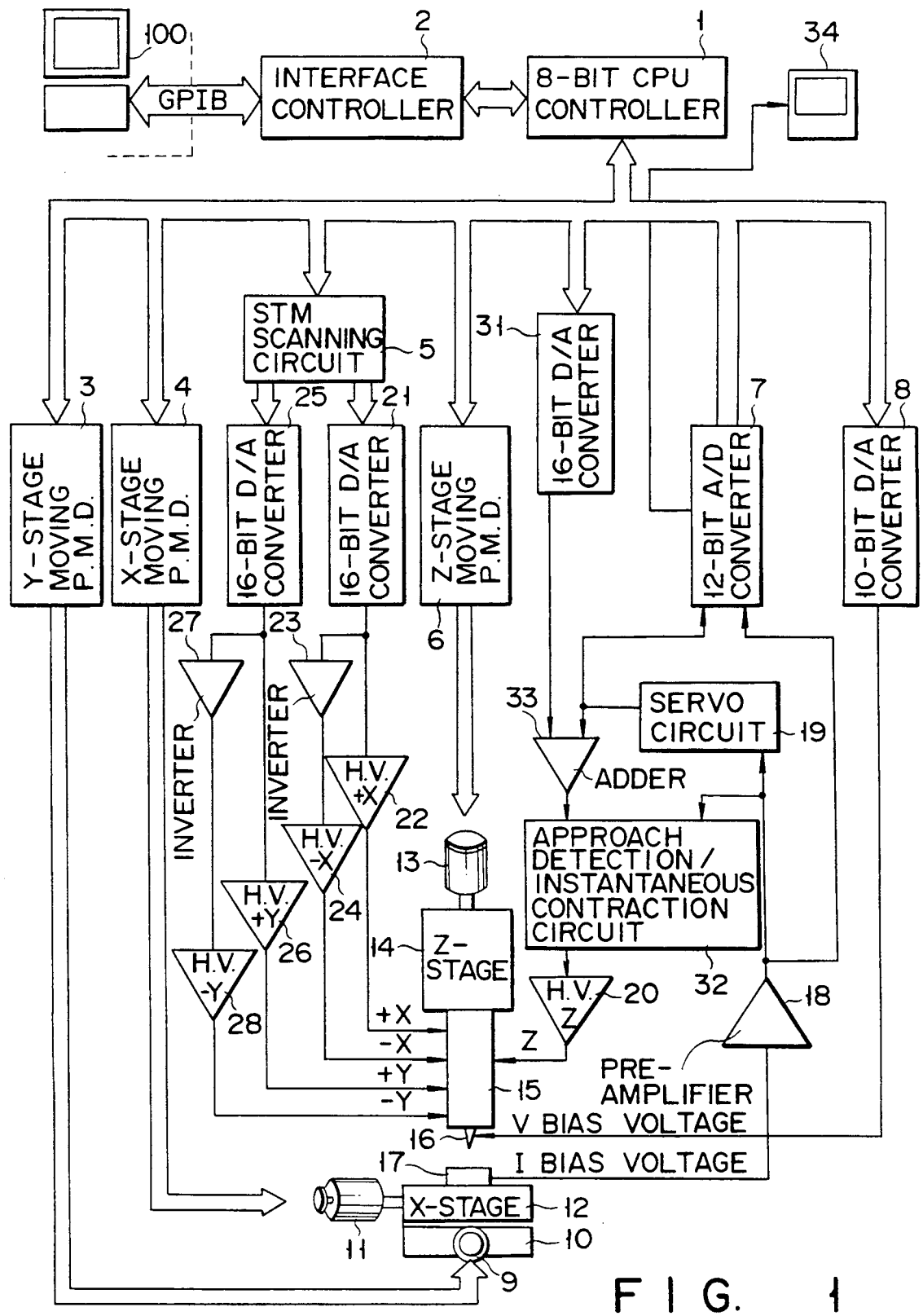
F I G. 1

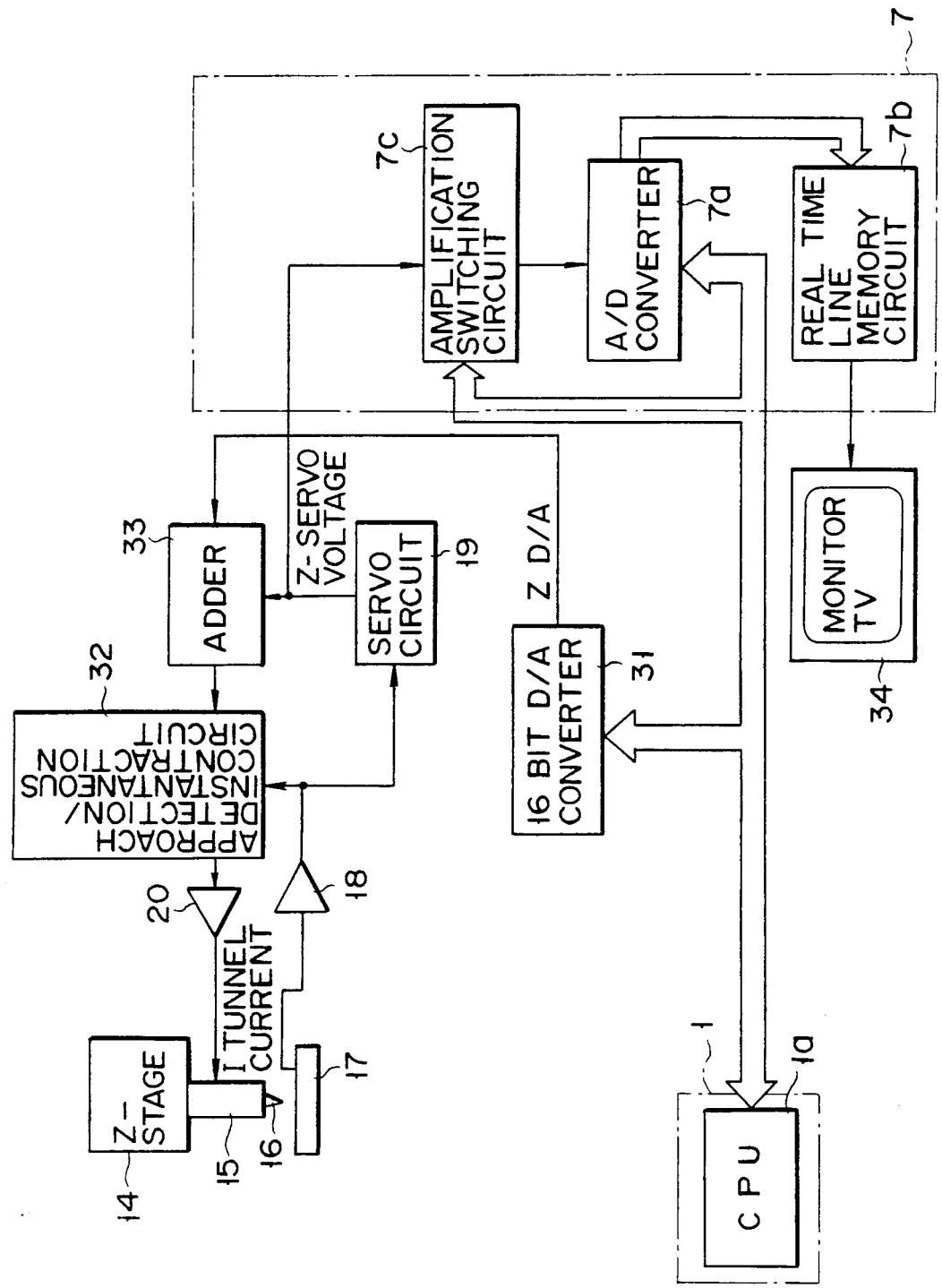
F I G. 4

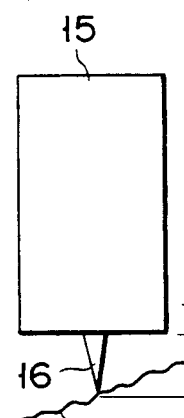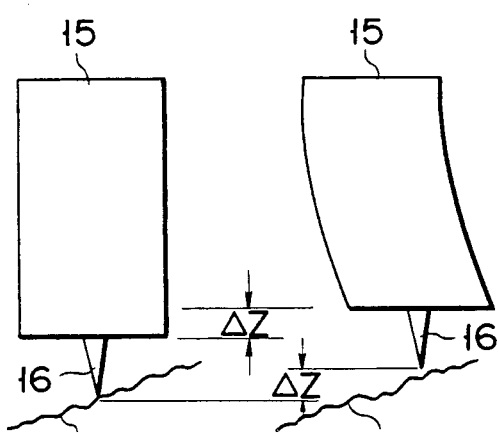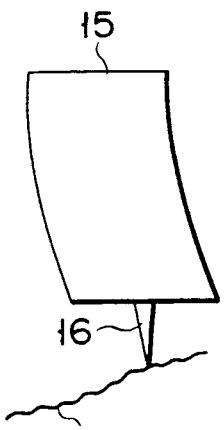
FIG. 9A   FIG. 9B   FIG. 9C
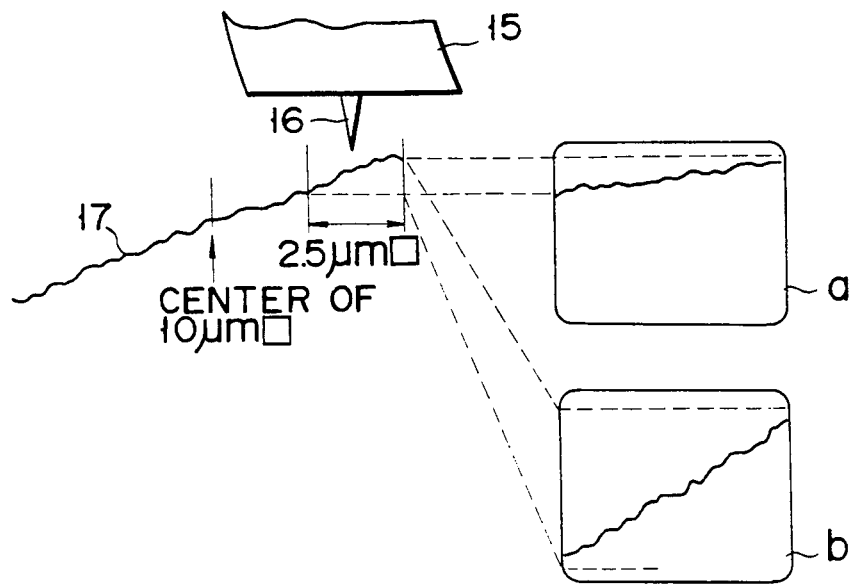
FIG. 10

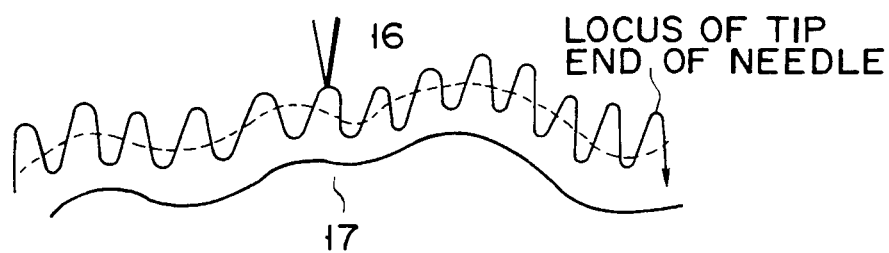
F I G. 12
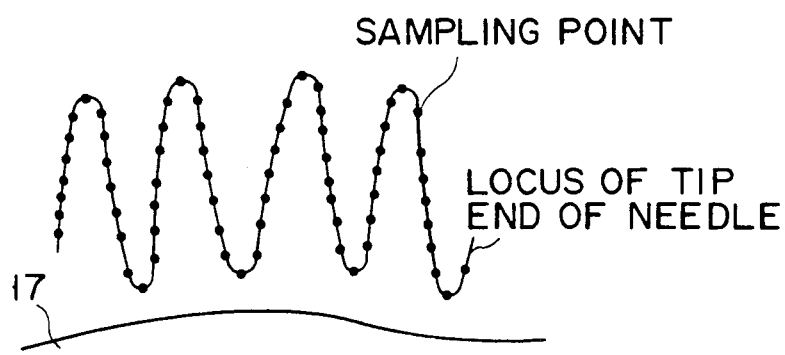
F I G. 13

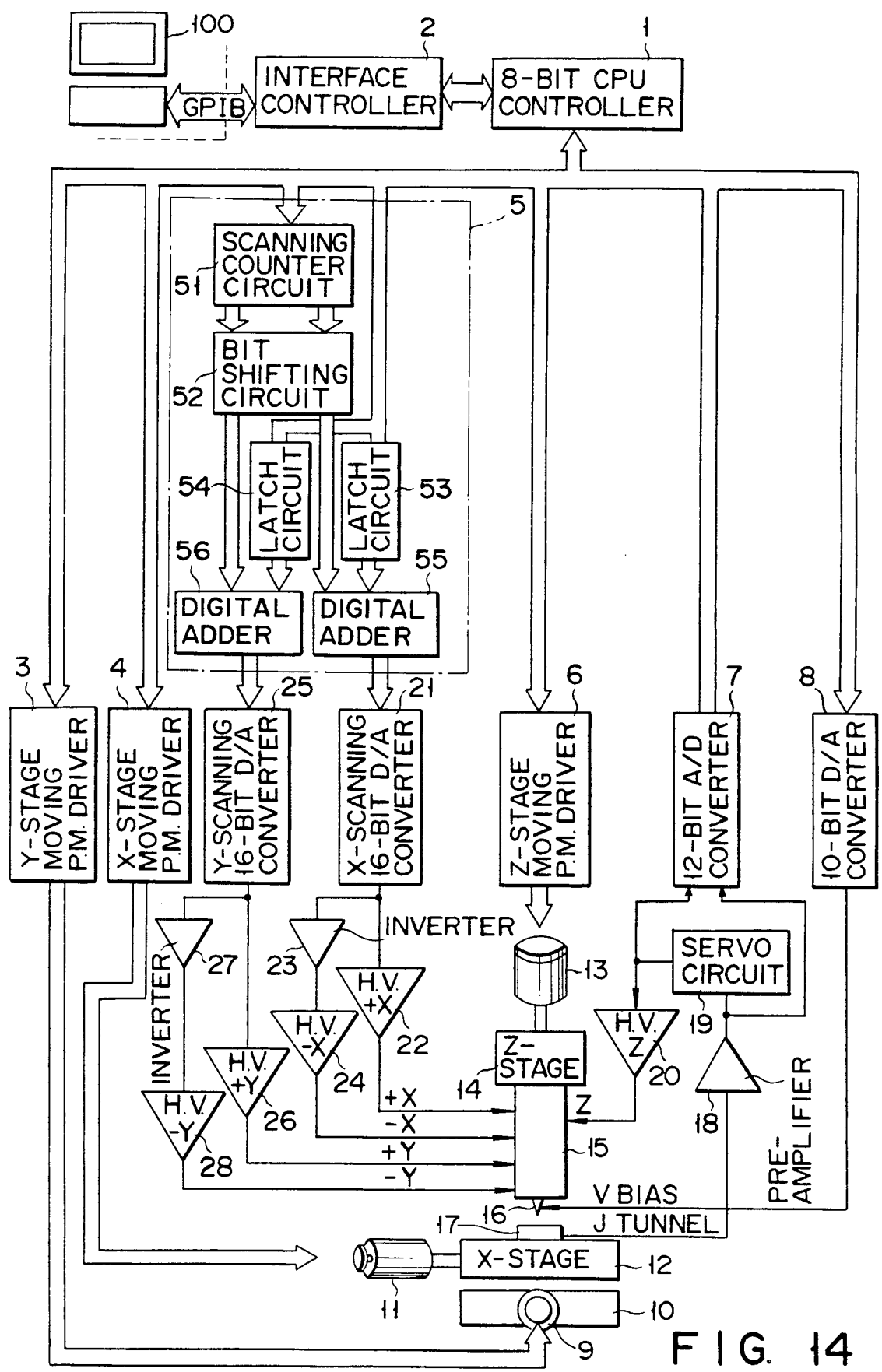
F I G. 14

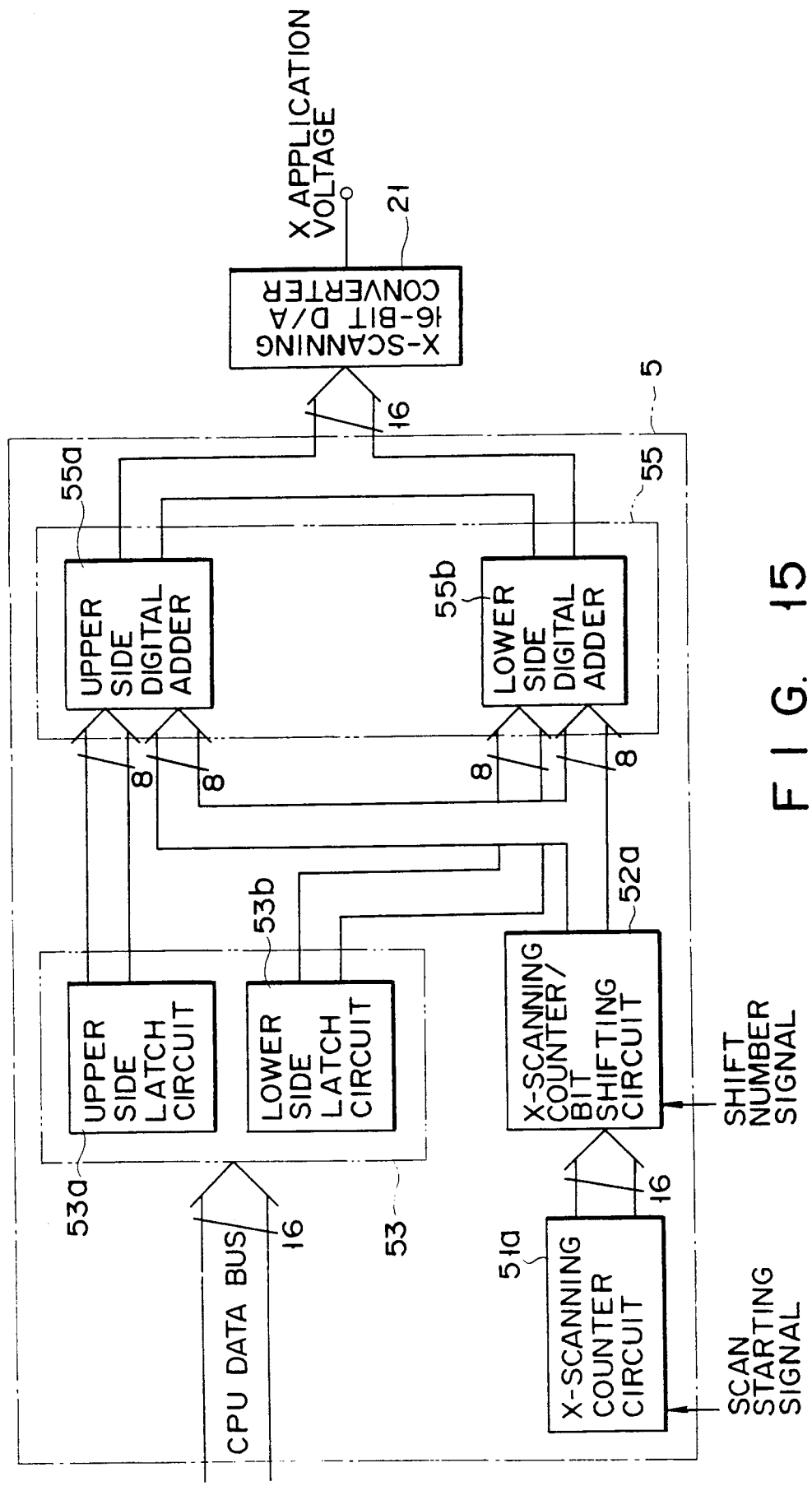
F I G. 15

SCANNING TUNNELING MICROSCOPE HAVING PROPER SERVO CONTROL FUNCTION

BACKGROUND OF THE INVENTION

1. Field of the Invention

This invention relates to a scanning tunneling microscope which can be used to observe the surface of a sample in the unit of atom size.

2. Description of the Related Art

Recently, a scanning tunneling microscope (STM) which can be used to observe the surface of a sample in the unit of atom size has been developed.

It is generally well known in the art that when a metal probe having a sharp tip end is set as close as approx. 1 nm to the surface of an electrically conductive sample and a preset voltage is applied between the probe and the sample, a tunnel current flows between the probe and the sample. The tunnel current is largely dependent on a distance between the probe and the sample. The STM utilizes the property of the tunnel current to observe the surface of the sample. That is, when the probe is mounted on the actuator which can be moved in a 3-dimensional direction and it is scanned while the tunnel current is kept constant, the probe will move along the irregularity of the surface of the sample with a preset distance kept therebetween. Thus, variation of the surface state of the sample can be observed in the unit of atom size as an image by outputting the position of the probe as a 3-dimensional image.

In general, a servo circuit is used to adjust the distance between the probe and the sample in the STM. The servo circuit detects a tunnel current flowing between the probe and the sample and controls the driving operation of the actuator to keep the distance between the probe and the sample at a constant value based on the detected tunnel current.

In the conventional STM, adjustment of the distance between the probe and the sample is controlled only by use of the above servo circuit. Therefore, when the surface condition of the probe is bad, desired control cannot be effected. That is, when the sample has a slanted surface, undulated surface or a surface having holes formed therein and if the servo output is displayed on a CRT as an output indicating the surface condition of the sample based on the detected tunnel current, the CRT image plane cannot be effectively used and the STM image cannot be displayed within the image plane. In this case, the distance between the probe and the sample cannot be controlled by the servo system so that the STM image obtained can be displayed only with a low resolution in a vertical direction and the dynamic range thereof may be deviated from the central position.

Further, as described before, the STM is a microscope having a super high resolution and can be used to observe the surface configuration and surface properties of the sample in the unit of atom size. Therefore, in a case where a desired portion of the sample is observed, it is necessary to first observe a wide range (several μm) previously set to include the desired portion and then observe the desired portion.

Further, when an STM image (3-dimensional image) of the wide scanning range is observed, it is sometimes required to enlarge part of the image for more specific observation.

In order to meet the above requirements, in the prior art, an image obtained by wide range scanning with a preset resolution is displayed, then the scanning range is changed to a narrow scanning range and the probe is upwardly moved away from the sample surface by such a distance that the tunnel current cannot flow. Then, the scanning center is set on the position at which a portion to be enlarged lies by an X-Y rough moving mechanism using a pulse motor and the like and the lifted probe is set closer to the sample surface so as to be set within a tunnel current region, and then the scanning operation is effected again to display an image.

However, in the above method, the precision of the rough moving mechanism for moving the sample influences the reliability of the STM image. Actually, the precision of the rough moving mechanism is extremely lower than the resolution of the STM. According to the method in which the probe is separated from the sample after the wide range scanning operation is effected, and then moved by use of the rough moving mechanism and set closer to the sample again to display an STM image, the desired position cannot always be correctly set because of the low resolution and precision of the rough moving mechanism. Therefore, an enlarged image at exactly the desired position cannot always be obtained.

SUMMARY OF THE INVENTION

Accordingly, a first object of this invention is to provide a scanning type tunnel microscope in which a servo system for controlling the distance between the probe and the sample can always be set in a proper condition irrespective of the surface condition of the sample.

A second object of this invention is to provide a scanning type tunnel microscope capable of setting the starting position of the scanning operation for a desired scanning range to a desired position after the wide range scanning operation is effected without using a rough moving mechanism necessary for movement of the probe in a vertical direction so as to always correctly set the desired position and maintain the reliability of an enlarged image.

In order to attain the first object, a scanning tunneling microscope of this invention comprises:

a piezoelectric driver capable of expanding and contracting to adjust a distance between a probe and a sample according to a voltage applied thereto, the distance including a distance at which a tunnel current can flow between the probe and the sample;

a servo circuit for outputting a servo voltage for controlling expansion and contraction of the piezoelectric driver to keep the tunnel current at a constant value;

correction voltage generating means for generating a given correction voltage to correct a voltage to be supplied to the piezoelectric driver;

adding means for adding the servo voltage output from the servo circuit and the correction voltage supplied from the correction voltage generating means to each other to supply an added output to the piezoelectric driver; and control means for controlling the correction voltage supplied from the correction voltage generating means based on the servo voltage output from the servo circuit so as to keep the added output from the adding means at a given reference voltage.

In order to attain the second object, the scanning tunneling microscope of this invention further includes a scanning circuit for scanning the probe along the sample, and the scanning circuit includes means for causing the probe to scan at least a first scanning range corresponding to a portion of the sample to be observed and a second scanning range including the first scanning range and setting the size of said first scanning range; and adding means for adding output data from the setting means and data relating to a reference position of the first scanning range, corresponding to a reference position of the second scanning range, to each other in a digital manner.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a block diagram schematically showing the circuit construction of an STM;

FIG. 4 is a block diagram of a distance adjusting circuit showing a second embodiment of this invention;

FIGS. 8, 9A, 9B, 9C, and 10 are diagrams for illustrating a method of re-scanning part of a sample having a slanted surface in the second embodiment;

FIGS. 12 and 13 are diagrams for illustrating the operation of the third embodiment;

FIG. 14 is a block diagram schematically showing the circuit construction of an STM according to a fourth embodiment of this invention; and FIG. 15 is a block diagram showing the detail construction of a scanning circuit shown in FIG. 14.

DETAILED DESCRIPTION OF THE PREFERRED EMBODIMENTS

Figure 2:
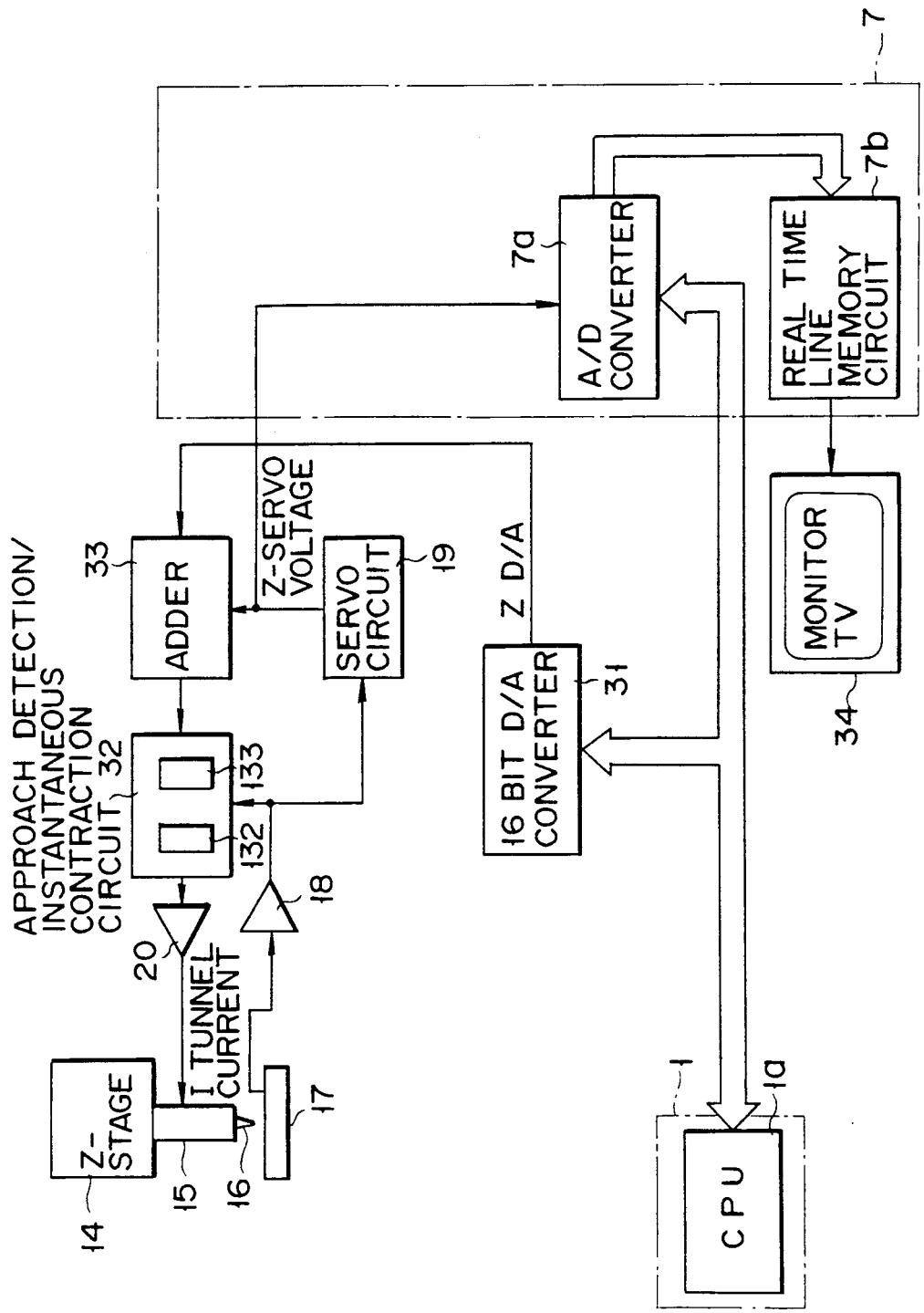
FIG. 2 is a block diagram of a distance adjusting circuit showing a first embodiment of this invention.

There will now be described embodiments of this invention with reference to the accompanying drawings.

FIG. 1 shows the construction of an STM (scanning tunneling microscope) according to this invention.

In FIG. 1, 1 denotes a 8-bit CPU (central processing unit) controller for controlling the whole portion of the STM. The 8-bit CPU controller 1 is connected to an interface controller 2 and to a host computer 100 via an interface (GPIB).

The 8-bit CPU controller 1 is connected to a Y-stage moving pulse motor driver (P.M.D) 3, an X-stage moving P.M.D 4, an STM scanning circuit 5, a Z-stage moving P.M.D 6, a 12-bit A/D converter 7 for subjecting a detection signal of tunnel current or Z electrode voltage signal to the A/D (analog/digital) conversion, a 10-bit D/A converter 8 for bias voltage application, and a 16-bit D/A converter 31 for Z voltage addition via respective 8-bit data buses.

The 16-bit D/A converter 31 converts binary data supplied from the 8-bit CPU controller 1 via the 8-bit data bus into an analog signal (ZD/A output).

The Y-stage moving P.M.D 3 drives a Y-stage moving P.M. 9 according to a driving signal (pulse data) from the 8-bit CPU controller 1 and moves the Y stage 10 in a Y direction (a direction perpendicular to the paper in the drawing).

The X-stage moving P.M.D 4 drives an X-stage moving P.M. 11 according to a driving signal from the 8-bit CPU controller 1 and moves the X stage 12 in an X direction (a horizontal direction in the drawing).

The Z-stage moving P.M.D 6 drives a Z-stage moving P.M. 13 according to a driving signal from the 8-bit CPU controller 1 and moves the Z stage 14 in a Z direction (a vertical direction in the drawing).

A tube scanner (piezoelectric driver) 15 constituting an actuator which can be moved in a 3-dimensional direction is mounted on the bottom surface of the Z stage 14, and a tunnel probe 16 used as a metal probe having a sharp tip end is supported on the bottom surface of the tube scanner 15. The tunnel probe 16 is mounted to be supplied with a bias voltage (V) by means of the 10-bit D/A converter 8.

On the other hand, a sample 17 is disposed on the top surface of the X stage 12 which faces the Z stage 14. A tunnel current (I) flows in the sample 17 when a preset bias voltage is applied thereto with the tunnel probe 16 set as close as approx. 1 nm to the surface of the sample. The tunnel current flowing in the sample 17 is supplied to a servo circuit 19, 12-bit A/D converter 7 and approach detection/instantaneous contraction circuit 32 via a tunnel current amplifying pre-amplifier 18.

The servo circuit 19 creates such a Z electrode voltage signal (Z servo voltage) for keeping the distance between the tunnel probe 16 and the sample 17 constant based on a detection signal of the tunnel current supplied via the pre-amplifier 18, and outputs the same to the 12-bit A/D converter 7 or Z voltage adder (addition circuit) 33. The servo circuit 19 is constituted by a PI control circuit for creating a Z servo voltage (for example, $-10$ V to $+10$ V) and an analog switching circuit for selecting the destination to which the Z servo voltage is supplied.

The adder 33 adds a ZD/A output from the 16-bit D/A converter 31 and a Z servo voltage output from the servo circuit 19 together and outputs the addition result to the approach detection/instantaneous contraction circuit 32.

The approach detection/instantaneous contraction circuit 32 selects one of an addition output from the adder 33 and a maximum contraction voltage which is previously determined to cause the tube scanner 15 to be in a maximum contracted state and outputs the selected signal to a Z electrode applying high voltage amplifier (H.V.Z) 20. The approach detection/instantaneous contraction circuit 32 is constituted by an analog switching circuit 132 (FIG. 2) for selecting one signal and a flip-flop circuit 133 (FIG. 2) for instantaneously setting the analog switching circuit to the maximum contraction voltage position when it is detected that a tunnel current is produced from the pre-amplifier 18 when the tunnel probe 16 has approached the surface of the sample 17.

The H.V.Z 20 amplifies an output of the approach detection/instantaneous contraction circuit 32 by ten times, for example, and applies the amplified output to the tube scanner 15. As a result, the tube scanner 15 is expanded or contracted to change the distance between the tunnel probe 16 and the sample 17. In this case, the length of the tube scanner 15 is set as a reference length when a signal (Vz) applied to the Z electrode is 0 V, and the tube scanner 15 is contracted by 1 μm by application of −100 V and expanded by 1 μm by application of +100 V.

As shown in FIG. 2, the 12-bit A/S converter 7 includes an A/D converter 7a for converting an input signal to digital (binary) data and outputting the converted data to the CPU controller 1 and a real time line memory circuit 7b for storing the digital data converted by the A/D converter, and the digital data is displayed on a monitor TV 34 as a real time cross-section image.

The STM scanning circuit 5 effects the count up-/down operation according to a scanning starting signal supplied from the 8-bit CPU controller 1 via the 8-bit data bus to create a scanning signal in the X direction and a scanning signal in the Y direction.

An X scanning 16-bit D/A converter 21 to which the scanning signal in the X direction is supplied creates an analog voltage signal (X application voltage) corresponding to an input and outputs the same to a −X electrode application high voltage amplifier (H.V.−X) 24 via a +X electrode application high voltage amplifier (H.V.+X) 22 and an inverter circuit 23. When the +X application voltage and −X application voltage are applied to the tube scanner 15 via the H.V.+X 22 and H.V.−X 24, respectively, the tube scanner 15 is deformed so as to cause the tip end of the tunnel probe 16 to scan the surface of the sample 17 in the X direction.

A Y scanning 16-bit D/A converter 25 to which the scanning signal in the Y direction is supplied creates an analog voltage signal (Y application voltage) corresponding to an input and outputs the same to a −Y electrode application high voltage amplifier (H.V.−Y) 28 via a +Y electrode application high voltage amplifier (H.V. +Y) 26 and an inverter circuit 27. When the +Y application voltage and −Y application voltage are applied to the tube scanner 15 via the H.V.+Y 26 and H.V.−Y 28, respectively, the tube scanner 15 is deformed so as to cause the tip end of the tunnel probe 16 to scan the surface of the sample 17 in the Y direction.

FIG. 2 shows a scanning system in the Z direction which is taken out as a distance adjusting circuit in the first embodiment of this invention.

In FIG. 2, 1a denotes a CPU serving as a control circuit constituting the 8-bit CPU controller 1. 7a denotes an A/D converter, 7b denotes a real time line memory circuit, and the A/D converter 7a and real time line memory circuit 7b are combined to constitute the 12-bit A/D converter 7.

Next, the automatic approaching method by use of the above construction is explained.

Figures 3A, 3B, 3C, 3D, 3E:
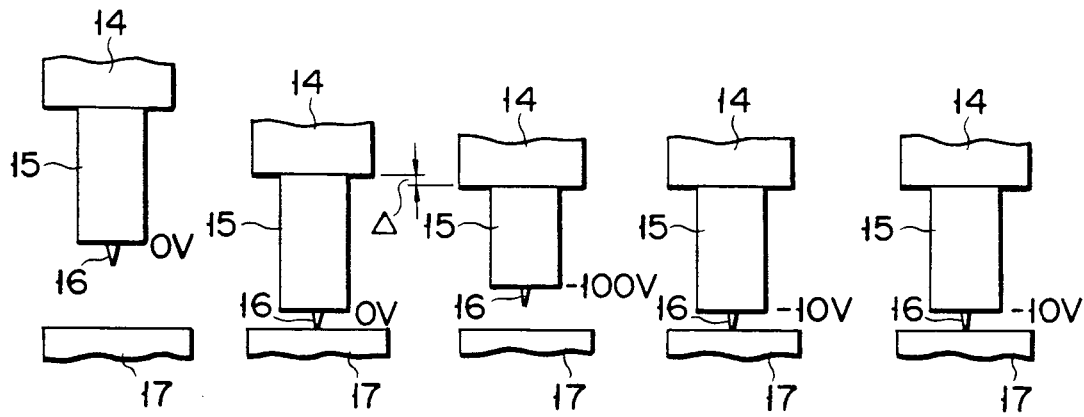
FIG. 3A to 3E are diagrams for illustrating the automatic approaching method in the first embodiment of this invention.

First, a ZD/A output of the 16-bit D/A converter 31 is set to 0 V by the control operation of the CPU 1a. The analog switching circuit of the servo circuit 19 is turned off to prevent a Z servo voltage from being output to the adder 33. Further the approach detection-/instantaneous contraction circuit 32 is set to select an addition output from the adder 33. As a result, a voltage (Vz) applied to the tube scanner 15 via the H.V.Z 20 is set to 0 V. Thus, as shown in FIG. 3A, the tube scanner 15 is set to the reference length.

If the Z stage moving P.M.D 6 is controlled by the CPU 1a in this condition, the P.M. 13 is driven to move the Z stage in the downward direction. Then, the tube scanner 13 is lowered by the movement of the Z stage 14, thus setting the tunnel probe 16 close to the sample 17. In this case, as shown in FIG. 3B, the tunnel probe 16 is gradually moved according to the resolution (for example, 0.1 μm) of the P.M. 13.

Assume that a tunnel current caused by application of a bias voltage is detected at the approaching time. Then, the downward movement of the Z stage 14 by the P.M. 13 is stopped and the analog switching circuit in the approach detection/instantaneous contraction circuit 32 is switched to a position of maximum contraction voltage (−10 V). Therefore, a voltage (Vz=−100 V) which is amplified by 10 times by means of the H.V.Z 20 is applied to the tube scanner 15. As a result, as shown in FIG. 3C, the tube scanner 15 is instantaneously contracted. However, only the Z stage 14 is stopped in position where it is lowered by Δ because of the resolution of the P.M. 13.

Further, at this time, the analog switching circuit of the Z servo circuit 19 is turned on to permit a Z servo voltage to be applied to the adder 33. Then, a ZD/A output of the 16-bit D/A converter 31 is set to −10 V by control of the CPU 1a. Therefore, the tube scanner 15 is applied with a voltage Vz (−10 V) which is obtained by amplifying an addition output of a ZD/A output (−10 V) of the 16-bit D/A converter 31 and a Z servo voltage (+9 V) from the servo circuit 19 by 10 times by means of the H.V.Z 20. As a result, as shown in FIG. 3D, the tube scanner 15 is expanded nearly to the reference length and thus set into the tunnel region. However, the length of the tube scanner 15 is shorter than the reference length by 0 to 0.1 μm because of the resolution of the P.M. 13.

After this, the ZD/A output of the 16-bit D/A converter 31 is controlled by the CPU 1a while the servo voltage from the servo circuit 19 is being read by the CPU 1a via the A/D converter 7. Then, when the servo voltage is set to 0 (reference voltage), the ZD/A output of the 16-bit D/A converter 31 is fixed. As a result, as shown in FIG. 3E, a state in which a voltage Vz (−10 V) obtained by amplifying an addition output of the ZD/A output (−1 V) from the 16-bit D/A converter 31 and the Z servo voltage (0 V) from the servo circuit 19 by 10 times by means of the H.V.Z 20 is applied is maintained.

When the Z servo voltage is 0 V, irregularity data with 0 set as its center can be derived by scanning if the input dynamic range of the A/D converter 7a is set from −10 V to +10 V. In this case, an image with the central horizontal line set as a reference is displayed as a real time cross-section image on the monitor TV 34.

As described above, in this invention, the tunnel probe 16 is set closer to the sample 17 by using a rough moving mechanism such as the P.M. 13 which effects the stepwise movement and the tube scanner 15 is instantaneously contracted immediately after it is set into the tunnel region and the rough movement is interrupted. At this time, application of the Z servo voltage is started to expand the tube scanner 15 to substantially the reference length, thus setting up the servo state. Next, deviation of the application voltage Vz from the reference voltage due to the resolution of the rough movement in the above state can be corrected (subjected to the Z servo voltage adjustment) by adjusting the ZD/A output.

Further, according to this method, the STM operation can be started at a high speed in comparison with a case wherein the approaching operation is effected by repeatedly effecting the rough and fine movements.

FIG. 4 shows a scanning system in the Z direction taken as distance adjusting means in a second embodiment of this invention.

In FIG. 4, 7a denotes an A/D converter, 7b denotes a real time line memory circuit and 7c denotes an amplification switching circuit acting as a variable amplifier, and the A/D converter 7a, real time line memory circuit 7b and amplification switching circuit 7c are combined to constitute a 12-bit A/D converter 7.

Figure 5:
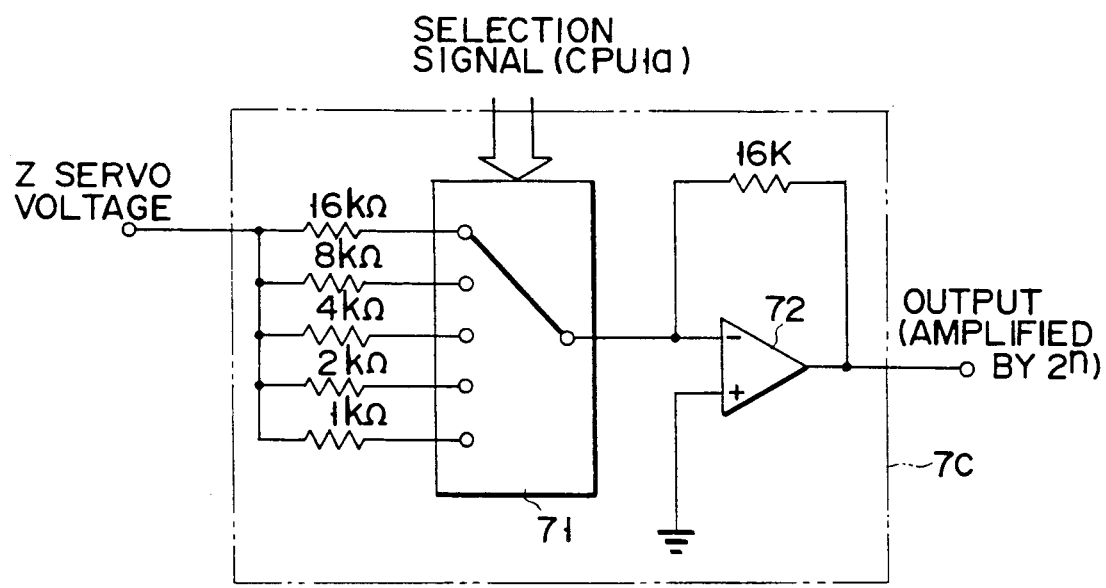
FIG. 5 is a circuit diagram of an amplification switching circuit.

As shown in FIG. 5, for example, the amplification switching circuit 7c is constructed mainly by an analog multiplexer 71 for selecting various resistors and an inverting type amplifier 72 and amplifies a Z servo voltage supplied from the servo circuit 15 by $2^n$ (n=0 to 4). Selection by the analog multiplexer 71 is effected according to a selection signal from the CPU 1a.

Next, a method of amplifying and displaying a real time cross-section image in the above construction is explained.

In a case where an irregular portion to be observed is previously determined, the tunnel probe 16 is first approached to the portion by the above method and then scanned by one line in the X and Y directions. A real time cross-section image obtained at this time is displayed on the monitor TV 34 and therefore whether the target irregular portion can be correctly approached or not can be determined by observing the real time cross-section image.

Figure 6:
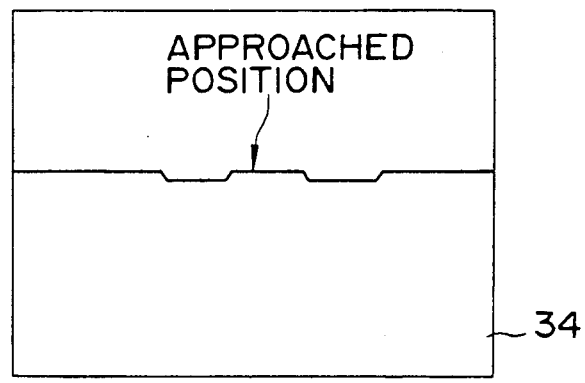
FIGS. 6 and 7 are diagrams showing a method of amplifying and displaying real time cross-section images in the second embodiment.
Figure 7:
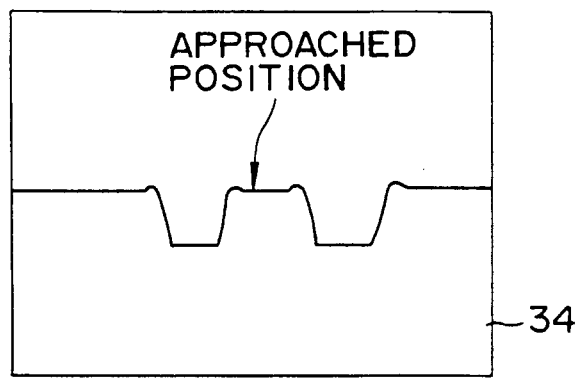

When the real time cross-section image displayed on the monitor TV 34 shows that variation in the irregularity is small as shown in FIG. 6, the amplification factor of the amplification switching circuit 7c is changed by the CPU 1a. After this, a one-line scanning operation is effected again. As a result, as shown in FIG. 7, a real time cross-section image in which the target irregular portion is enlarged in the Z direction according to the amplification factor of the amplification switching circuit 7c is displayed on the monitor TV 34. That is, when the irregularity is small, for example, when variation in the Z servo voltage is small, the servo voltage is amplified with ±0 V set as the center of the variation and then supplied to the A/D converter 7a. Thus, it is possible to easily determine whether the target irregular portion is correctly approached or not.

In a case where the amplification factor of the amplification switching circuit 7c is set to x16, irregularity data having substantially the sam resolution as data which is derived by an A/D converter having a resolution of 16 bits can be obtained.

In this way, data of high resolution can be obtained from the sample even if the irregularity thereof is small by correcting the offset component to set the Z servo voltage to 0 V according to the ZD/A output without amplifying the offset component to cause a saturated state.

Next, with the above construction, there is explained a case where the scanning range for a slanted sample 17 is narrowed and the scanning operation is effected again after the scanning center position is moved.

Figure 8:
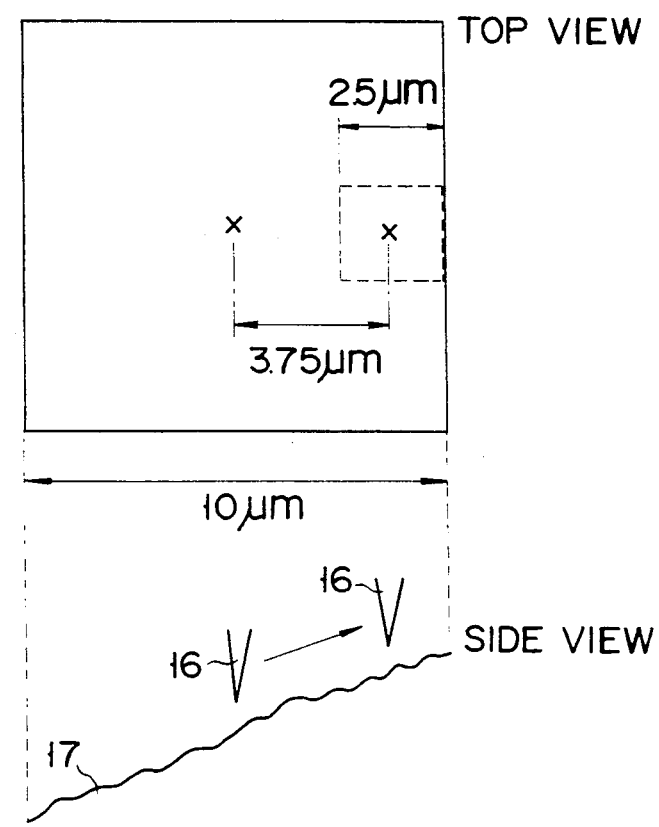

For example, assume that, as shown in FIG. 8, the tunnel probe 16 which is set under the servo condition is moved in the right direction in the drawing by 3.75 μm from the central position of of an area of 10 μmo on the slanted sample 17 and then the operation of scanning an area of 2.5 μmu is effected again with the above set position used as a scanning center position. In this case, the scanning counter circuit 5 is controlled by the 8-bit CPU controller 1 so as to output scanning signals in the X and Y directions which respectively correspond to a deviation amount (3.75 μm) from the center of the area of 10 μm□ and the range (2.5 μm) of rescanning. Then the tube scanner 15 is deformed by application of the voltages corresponding to the scanning signals so that the tunnel probe 16 can be moved while it is kept under the servo condition.

At this time, since the sample 17 is slanted, the tube scanner 15 is contracted by ΔZ as shown in FIGS. 9A and 9B. That is, a state in which the ZD/A output of the 16-bit D/A converter 31 is set at −1 V and the servo voltage of the servo circuit 19 is set at 0 V and as a result the voltage Vz (−10 V) amplified by 10 times by the H.V.Z 20 is applied to the tube scanner 15 (refer to FIG. 9A) is changed into a state in which the Z servo voltage is set at −4 V and as a result the voltage Vz applied to the tube scanner 15 is set to −50 V (refer to FIG. 9B).

In this state, as described in the automatic approaching method, the ZD/A output of the 16-bit D/A converter 31 is changed in a negative direction to change the Z servo voltage towards 0 V. Then, when the Z servo voltage is set at 0 , the ZD/A output of the 16-bit D/A converter 31 is fixed. That is, as shown in FIG. 9C, the Z servo voltage is changed from −4 V to 0 V and the ZD/A output is changed from −1 V to −5 V, but the same voltage Vz −50 V is applied to the tube scanner 15.

As a result, even if the irregularity is small as shown by a in FIG. 10, data can be taken by the A/D converter 7a after the servo voltage is amplified with ±0 V set as the center of the variation. Thus, as shown by b in FIG. 10, data (real time cross-section image) of high resolution can be obtained for the range of 2.5 μm□.

Figure 11:
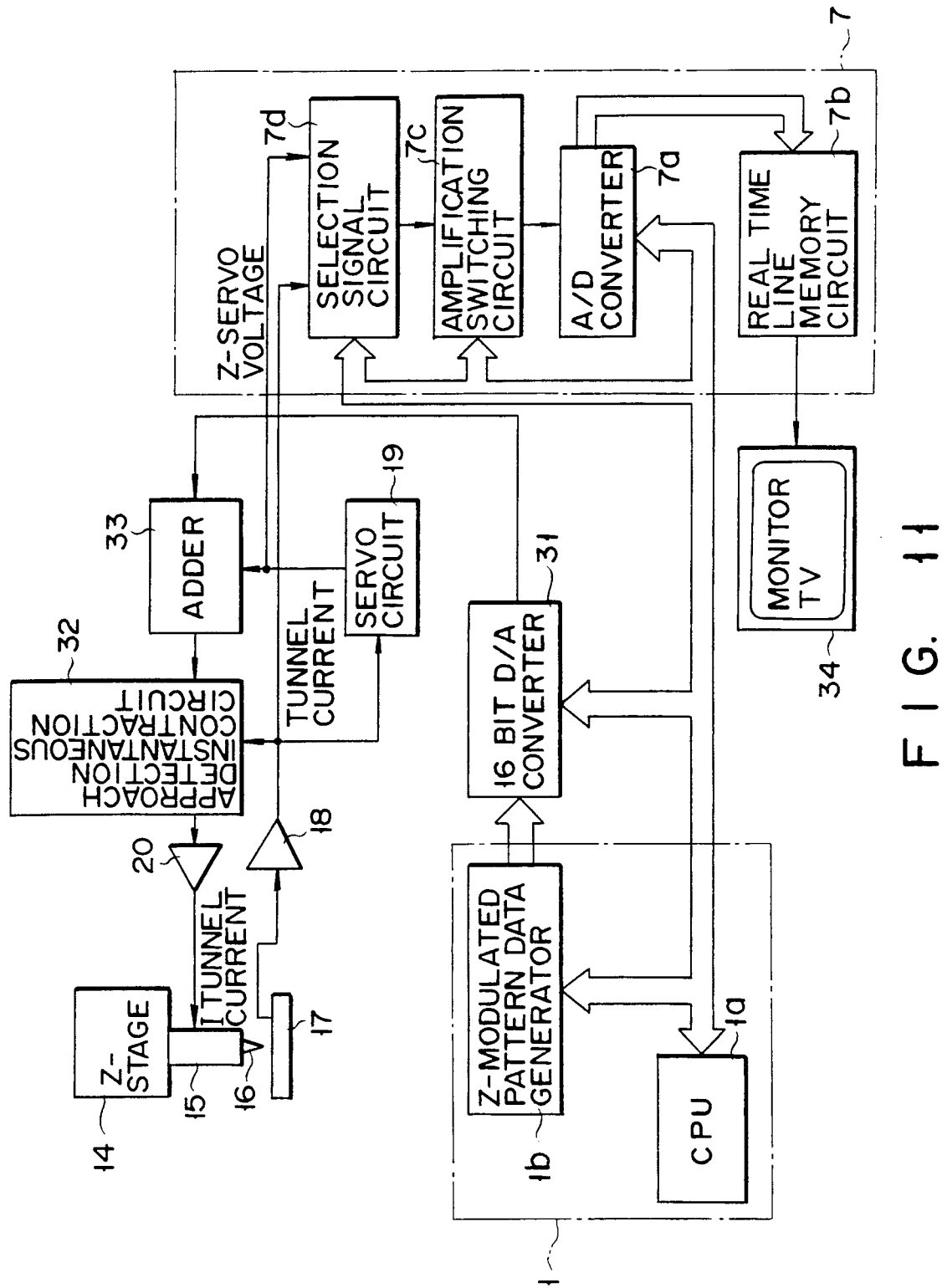
FIG. 11 is a block diagram of a distance adjusting circuit showing a third embodiment of this invention.

FIG. 11 shows a scanning system in the Z direction as a distance adjusting circuit in a third embodiment of this invention. In this embodiment, the STM is used as an STS for measuring the physical property of the surface (electron state density of the sample surface) of the sample 17 by modulating the distance between the tunnel probe 16 and the sample 17 and deriving a tunnel current.

That is, in the case of this distance adjusting circuit, the 8-bit CPU controller 1 includes a Z modulation pattern data generator 1b as a modulation pattern generating circuit in addition to the CPU 1a used as a control circuit. Further, the 12-bit A/D converter 7 includes an A/D converter 7a , real time line memory circuit 7b, amplification switching circuit 7c and signal selection circuit 7d.

The Z modulation pattern data generator 1b includes an up/down counter circuit having a counting range of, for example, "$0000_H$" to "$000F_H$", "$001F_H$" and "$003F_H$" and changes the up/down counting range according to the modulation range of the tunnel probe 16. Output binary data of the counter circuit is supplied to the 16-bit D/A converter 31 to finely modulate the ZD/A output of the 16-bit D/A converter 31. The start and interruption of the operation and change of the counting range in the Z modulation pattern data generator 1b can be controlled by signals from the CPU 1a.

The signal selection circuit 7d selects one of the Z servo signal (irregularity data) and a detection signal (converted into voltage) of tunnel current according to a signal from the CPU 1a and outputs the same to the amplification switching circuit 7c.

Further, a switching circuit only for PI control/I control and an I control gain switching circuit are additionally provided in the servo circuit 19.

Next, a method for measuring the electron state density of the sample surface with the above construction is explained First, the servo circuit 19 is switched to the I control circuit under the control of the CPU 1a and the (integration control) gain of the I control circuit is set to sufficiently follow the irregularity of the surface of the sample 17.

Then, the Z modulation pattern data generator 1b is controlled to be operated at a frequency relatively higher than roughness at which the image varies, that is, the space frequency to be followed by the I control, thus making it possible to modulate the ZD/A output of the 16-bit D/A converter 31 at a relatively high speed in comparison with the time constant of the servo circuit 19.

After this, the Z servo voltage from the servo circuit 19 and the ZD/A output from the 16-bit D/A converter 31 are added together by an adder 33. Then, the added output of the adder 33 is amplified by the H.V.Z 20 and applied to the tube scanner 15.

In this state, the X-Y scanning operation is effected. Then, the tip end of the tunnel probe 16 is moved on the surface of the sample 17 along a locus shown in FIG. 12.

At this time, a signal to be taken by the A/D converter 7a is switched from the Z servo voltage to the detection signal of tunnel current by controlling the signal selection circuit 7d. The electron state density of the sample surface can be measured by sampling signal data at points indicated in FIG. 13.

The tip end modulation sequence is well known in the art as a method for measuring the electron state density of the sample surface and its operation can be adjusted programmably by use of the distance adjusting circuit of this invention.

Thus, it can be used as an STS by deriving a detection signal of tunnel current in accordance with modulation of the ZD/A output of the 16-bit D/A converter 31.

As described above, a servo control suitable for the surface condition of the sample can be effected by operating the distance adjusting circuit in accordance with the surface condition obtained by the tunnel current.

That is, deviation of an application voltage from the reference voltage in the Z direction caused by the resolution of the rough moving mechanism when the tunnel probe is approached to the surface of the sample can be corrected by applying a voltage which causes the servo voltage to be set to 0 V. As a result, the operation for the approach of the tunnel probe can be simplified and the distance between the tunnel probe and the sample can be servo-controlled in accordance with the surface condition of the sample. Therefore, since irregularity data with 0 V set as its center can be derived in the scanning operation, reduction in the resolution of the real time cross-section image and deviation of the dynamic range from its center can be prevented.

Further, since irregularity data with 0 V set as its center can be derived, variation in the small irregularity of the sample surface can be enlarged and displayed by amplifying the irregularity data.

In addition, since the distance between the tunnel probe and the sample can be servo-controlled in accordance with the surface condition of the sample, it can be used as an STS for measuring the electron state density of the sample surface by modulating the distance between the tunnel probe and the sample In the above embodiment, the probe is mounted so as to be supported by the piezoelectric driver, but this is not limitative and it is possible to support the sample.

Next, a fourth embodiment of this invention which is improved over the STM scanning circuit 5 is explained with reference to FIG. 14.

In FIG. 14, portions which are the same as those of FIG. 1 are denoted by the same reference numerals. Therefore, the explanation therefor is omitted, but in this embodiment, a Z electrode voltage signal (Z servo voltage) from a servo circuit 19 is directly supplied to a 12-bit A/D converter 7 and a Z electrode applying high voltage amplifier (H.V.Z.) 20. The Z servo voltage is applied to the tube scanner 15 via the H.V.Z. 20 to expand and contract the tube scanner 15 so as to keep the distance between the probe 16 and the surface of a sample 17 constant.

In this embodiment, the STM scanning circuit 5 is constituted mainly by a bit shift circuit and a digital adder. That is, the STM scanning circuit 5 includes a scanning counter circuit (scanning 16-bit output counter) 51 for effecting the counting up/down operation in response to a scanning signal supplied from an 8-bit CPU controller 1 via a CPU data bus, a bit shift circuit (scanning range switching bit shifter) 52 for shifting an output of the scanning counter circuit 51 to the LSB (Least Significant Bit) side by a desired bit number according to a shift number signal (range setting data) supplied from the 8-bit CPU controller 1, latch circuits (scanning offset 16-bit data latch circuits) 53 and 54 for latching scanning offset values (reference position data) supplied from the 8-bit CPU controller 1, a digital adder 55 for creating a scanning signal in the X direction, for example, by adding an output of the latch circuit 53 and an output of the bit shift circuit 52 together, and a digital adder 56 for creating a scanning signal in the Y direction, for example, by adding an output of the latch circuit 54 and an output of the bit shift circuit 52 together.

An output of the digital adder 55 is supplied to an X-scanning 16-bit D/A converter 21. The X-scanning 16-bit D/A converter 21 creates an analog voltage output (X application voltage) corresponding to an input and outputs the same to a −X electrode applying high voltage amplifier (H.V.−X) 24 via a +X electrode applying high voltage amplifier (H.V.+X) 22 and an inverter circuit 23. When the +X application voltage and −X application voltage are applied to the tube scanner 15 via the H.V.+X 22 and H.V.−X 24, respectively, the tube scanner 15 is deformed by application of the voltages so that the tip end of the probe 16 can scan a desired scanning area on the surface of the sample 17 in the X direction according to the scanning starting position corresponding to the reference position data An output of the digital adder 56 is supplied to a Y-scanning 16-bit D/A converter 25. The Y-scanning 16-bit D/A converter 25 creates an analog voltage output (Y application voltage) corresponding to an input and outputs the same to a −Y electrode applying high voltage amplifier (H.V.−Y) 28 via a +Y electrode applying high voltage amplifier (H.V.+Y) 26 and an inverter circuit 27. When the +Y application voltage and −Y application voltage are applied to the tube scanner 15 via the H.V.+Y 26 and H.V.−Y 28, respectively, the tube scanner 15 is deformed by application of the voltages so that the tip end of the probe 16 can scan a desired scanning area on the surface of the sample 17 in the Y direction according to the scanning starting position corresponding to the reference position data In this way, in this invention, the scanning range and the scanning starting position thereof can be changed without separating the probe 16 from the sample 17 or using a digital addition output of a rough moving mechanism by using an output of the bit shifter to which range setting data is input and the reference position data as a scanning signal.

FIG. 15 shows the construction of the STM scanning circuit 5 in more detail. For convenience, only a scanning system in the X direction is shown and explained in this example.

An X scanning counter circuit 51a repeatedly effects the count up/down operation between "$0000_H$" and "$FFFF_H$" according to the scanning starting signal from the 8-bit CPU controller 1 by a number of times equal to the number of scanning lines and stops the counting operation when "$0000_H$" is reached.

An X scanning count bit shift circuit 52a shifts a 16-bit count value supplied from the X scanning counter circuit 51a to the LSB side by a bit number corresponding to a shift number signal from the 8-bit CPU controller 1 and outputs data (output count value) having "0" set into a vacant bit or bits of the MSB side to the X count value digital adder 55. That is, in the X scanning count bit shift circuit 52a, in a case where a count value from the X scanning counter circuit 51a is "$FFFF_H$", for example, "$7FFF_H$" is output as an output count value when a 1-bit shift is set and "3FFF H" is output as an output count value when a 2-bit shift is set. Thus, the output count value from the X scanning count bit shift circuit 52a is set to $\frac{1}{2}$, $\frac{1}{4}$, $\frac{1}{8}$, --of a count value supplied from the X scanning counter circuit 51a by changing the setting of the bit shift number. Therefore, when the 1-bit shift is set, the X scanning count value becomes equal to a value obtained by repeatedly effecting the counting operation between "$7FFF_H$" and "$0FFF_H$" by a number of times corresponding to a scanning line number in the output of the digital adder 55.

The X count value digital adder 55 is constituted by an upper digit side digital adder 55a and a lower digit side digital adder 55b, and divides an X scanning offset value set into a scanning offset 16-bit data latch circuit 53 by the 8-bit CPU controller 1 and an output count value supplied from the X scanning count bit shift circuit 52a into the upper digit portion and lower digit portion and add them together in respective digit sides. That is, in the upper digit side digital adder 55a, the upper 8 bits of the offset value supplied from an upper digit side latch circuit 53a of the latch circuit 53 and the upper 8 bits of an output count value supplied from the X scanning count bit shift circuit 52a are added together. Likewise, in the lower digit side digital adder 55b, the lower 8 bits of the offset value supplied from a lower digit side latch circuit 53b of the latch circuit 53 and the lower 8 bits of an output count value supplied from the X scanning count bit shift circuit 52a are added together. Therefore, in a case where the bit shift number of the X scanning count bit shift circuit 52a is set at "1", an X scanning count which is an output of the digital adder 55 becomes equal to a value obtained by repeatedly effecting the counting operation between "$4000_H$" and "$BFFF_H$" by a number of times corresponding to a scanning line number when "$4000_H$" is latched in the latch circuit 53 as an offset value, for example.

The X scanning 16-bit D/A converter 21 to which an output of the digital adder 55 is supplied outputs an X application voltage of "0" V when it is supplied with "0000 H " as an input, for example, and outputs an X application voltage of "10" V when it is supplied with "$FFFF_H$".

The construction described above is for a system for moving the probe 16 in the X direction, but a scanning system in the Y direction for moving the probe in the Y direction has substantially the same construction. However, in the case of the Y-direction scanning system, a Y scanning counter circuit effects the counting up/down operation between "$0000_H$" and "$FFFF_H$" only once according to the scanning starting signal from the 8-bit CPU controller 1. That is, a Y scanning clock at the counting-up time has a frequency obtained by dividing the frequency of an X scanning clock (scanning line number $\times 2$) and is changed to have the same frequency as the X scanning clock when all the lines are scanned in the X direction. Then, a counting-down operation is started and stopped when "$0000_H$" is reached.

The scanning count bit shift circuit converts an output count value to $\frac{1}{2}^n$ times by shifting a 16-bit count value supplied from the Y scanning counter circuit by n bits. In this case, since the scanning range is square, the value of n (bit shift number) is set to the same value for the X and Y scanning.

Next, the operation with the above construction is explained. In this case, an STM having the maximum scanning range of 10 μm $\times$ 10 μm is used. First, a wide scanning operation for an area of 10 μm□ is effected and a scanning operation for a scanning area of 2.5 μm□ with a desired point set as its reference after an STM image thereof is observed.

For example, assume now that a scanning starting signal indicating the wide range scanning for an area of 10 μm□ is supplied from the 8-bit CPU controller 1 to the STM scanning circuit 5 via the CPU data bus while the probe 16 is servo-controlled on the scanning starting position (reference position) on the sample 17. In this case, suppose that "0" is previously set in the bit shift circuit 52 as a bit shift number according to a shift number signal from the 8-bit CPU controller 1, and "$0000_H$" is set in the latch circuits 53 and 54 as X- and Y-scanning offset values, respectively.

Then, an X scanning count value obtained by repeatedly effecting the counting up/down operation between "$0000_H$" and "$FFFF_H$" by a number of times corresponding to a scanning line number, for example, 512 time, according to the scanning starting signal is output from the STM scanning circuit 5 to the X-scanning 16-bit D/A converter 21 and a Y scanning count value obtained by effecting the counting up/down operation between "$0000_H$" and "$FFFF_H$" by one time is output to the Y-scanning 16-bit D/A converter 25.

Therefore, an X application voltage (0 to 10 V) corresponding to an X scanning count value supplied from the STM scanning circuit 5 is output from the X-scanning 16-bit D/A converter 21 and is applied to the tube scanner 15 as an X-direction scanning signal. Likewise, a Y application voltage (0 to 10 V) corresponding to a Y scanning count value supplied from the STM scanning circuit 5 is output from the Y-scanning 16-bit D/A converter 25 and is applied to the tube scanner 15 as a Y-direction scanning signal.

Figure 16:
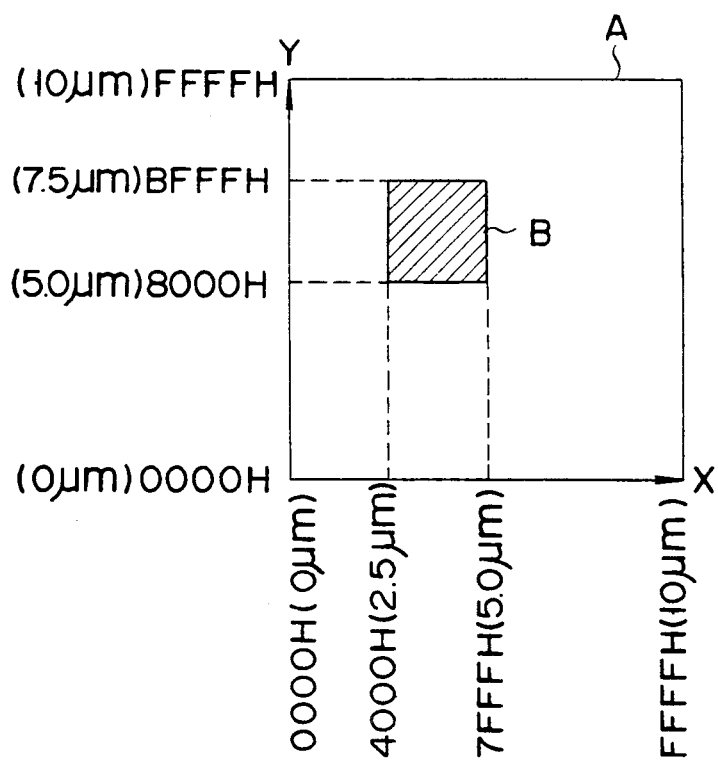
FIG. 16 is a diagram for illustrating the operation of the fourth embodiment.

As a result, the tube scanner 15 is deformed to move the tip end thereof in a range of 0 to 10 μm in the X direction and is moved in the Y direction in a range of 0 to 10 μm in each movement in the X direction. Then, as shown in FIG. 16, the probe 16 scans an area A of 10 μm□ on the sample 17.

Data obtained in the scanning operation is sampled at 512 points which is the same in number as the scanning lines, for example, and an STM image thus obtained is displayed on the top-view display by means of a host computer 100, thus making it possible to observe the contour or surface state of the sample 17 in the wide scanning area of 10 μm□. In this case, the STM image is displayed in a 2-dimensional (X, Y) manner and the Z direction is displayed by variation in brightness (luminance).

Assume that, when the STM image is observed, it is desired to enlarge and observe an image in an area of 2.5 μm□ having a position (desired point) which is set as a reference point and is separated from the reference position of a wide scanning area of 10 μm□ by $4000_H$ (2.5 μm) in the X direction and by $8000_H$ (5 μm) in the Y direction. In this case, a scanning starting signal defining that the scanning range is 2.5 μm × 2.5 μm is output from the 8-bit CPU controller 1 to the STM scanning circuit 5. That is, the bit shift number of the bit shift circuit 52 is set to "2" by a shift number signal from the 8-bit CPU controller 1. At this time, "$4000_H$" is set into the latch circuit 53 as the X-scanning offset value and "$8000_H$" is set into the latch circuit 54 as the Y-scanning offset value.

Then, in the STM circuit 5, the counting up/down operation between "$0000_H$" and "$FFFF_H$" is repeatedly effected by a number of times corresponding to the scanning line number, for example, 512 times by the X scanning counter circuit 51 (more precisely, the X scanning counter circuit 51a) according to the scanning starting signal and the counting result or X scanning count value is output to the bit shift circuit 52 (more precisely, X scanning count bit shift circuit 52a ).

The X scanning count value is bit-shifted by the bit shift circuit 52 according to the bit shift number "2" set by the shift number signal and then output to the digital adder 55.

An output from the bit shift circuit 52 or an output count value in the X direction is added together with X-scanning offset value "$4000_H$" set in the latch circuit 53 and then output to the X scanning 16-bit D/A converter 21.

On the other hand, a Y scanning count value obtained by effecting a count up/down operation between "$0000_H$" to "$FFFF_H$" by one time according to the above scanning starting signal is output from the scanning counter circuit 51 (more precisely, a Y scanning counter circuit not shown in the drawing) to the bit shift circuit 52 (more precisely, a Y scanning count bit shift circuit shot shown in the drawing).

Then, in the bit shift circuit 52, the Y scanning count value is bit-shifted and is output to the digital adder 56.

An output count value in the Y direction is added together with Y direction offset value "$8000_H$" set in the latch circuit 54 by the digital adder 56 and then output to the Y-direction 16-bit D/A converter 25.

Therefore, an X application voltage (2.5 to 5.0 V) corresponding to an X scanning count value supplied from the digital adder 55 is output from the X-scanning 16-bit D/A converter 21 and is applied to the tube scanner 15 as an X-direction scanning signal. Likewise, a Y application voltage (5.0 to 7.5 V) corresponding to a Y scanning count value supplied from the digital adder 56 is output from the Y-scanning 16-bit D/A converter 25 and is applied to the tube scanner 15 as a Y-direction scanning signal.

As a result, the tube scanner 15 is deformed to move the tip end thereof in a range of 2.5 μm to 5.0 μm in the X direction and is moved in a range of 5.0 μm to 7.5 μm in the Y direction for each movement in the X-direction. Thus, as shown in FIG. 16, the range (hatched portion) B of 2.5 μmo of the sample 17 is scanned by the probe 16.

In this case, an STM image of partly high resolution can be obtained by sampling the scanning data at points of the same number as the scanning line number or 512 points, for example, that is, at 512 points which is the same sampling number as that used in the case of scanning the wide range of 10 μm□.

As described above, the probe can be moved without being separated from the sample and part of the STM image obtained in the wide range scanning operation can be enlarged and displayed by re-scanning an area corresponding to the part of the STM image.

That is, a shift number signal for setting the size of a desired scanning range after the wide range scanning operation is completed is input to the bit shifter and an addition output obtained by adding an output of the bit shifter and offset values of the X and Y directions of the desired scanning range with respect to the reference position of the wide scanning range in a digital manner is used as a scanning signal so that the scanning range and the scanning starting position can be changed without separating the probe from the sample and using a rough moving mechanism. Therefore, part of the STM image obtained in the wide range scanning operation can be enlarged and displayed by re-scanning an area corresponding to the part of the STM image without causing scars on the sample by the probe at the approaching time and receiving an influence of an error caused by the precision of the rough moving mechanism. As a result, an STM image obtained may have a higher resolution in comparison with an image which is enlarged and displayed by the image processing, making it possible to precisely reproduce variation in the actual shape and reduce the load and time for effecting the re-scanning operation.

Some embodiments of this invention are explained above, but this invention is not limited to these embodiments and can be variously modified without changing the technical scope of this invention.

As described above, according to this invention, a scanning type tunnel microscope can be provided in which, since the distance adjusting means is operated according to the surface condition obtained by the tunnel current, a servo system for controlling the distance between the probe and the sample can always be properly operated irrespective of the surface condition of the sample.

Further, according to this invention, a scanning type tunnel microscope can be provided in which, since a digital addition output of an output of the bit shifter and reference position data is used as a scanning signal, a scanning starting position for a desired scanning range in a desired position set after the wide range scanning operation is completed can be set without using a rough moving mechanism, thereby always correctly setting the position and maintaining the reliability of an enlarged image.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A scanning tunneling microscope comprising:
   a piezoelectric driver capable of expanding and contracting to adjust a distance between a probe and a sample according to a voltage applied thereto, the distance including a distance at which a tunnel current can flow between said probe and said sample;
   a servo circuit for outputting a servo voltage for controlling expansion and contraction of said piezoelectric driver to keep the tunnel current at a constant value;
   correction voltage generating means for generating a given correction voltage to correct a voltage to be applied to said piezoelectric driver;
   adding means for adding the servo voltage output from said servo circuit and the correction voltage supplied from said correction voltage generating mean to each other to supply an added output to said piezoelectric driver; and
   control means for controlling the correction voltage supplied from said correction voltage generating means based on the servo voltage output from said servo circuit so a to keep the added output from said adding means at a given reference voltage.

2. The microscope according to claim 1, further comprising an approach detection/instantaneous contraction circuit for selecting one of the added output and a maximum contraction voltage for setting said piezoelectric driver into the maximum contracted state and outputting the selected voltage to said piezoelectric driver.

3. The microscope according to claim 2, wherein said approach detection/instantaneous contraction circuit includes a switching circuit for selecting one of the added output and the maximum contraction voltage, and a flip-flop circuit for setting said switching circuit to the maximum contraction selecting position when a tunnel current is detected.

4. The microscope according to claim 1, further comprising an A/D converting section having an A/D converter for converting said servo voltage to digital data and supplying the digital data to said control means and a real time line memory for storing the digital data; and a monitor TV for reading out the digital data from said memory and displaying the digital data on a real time basis.

5. The microscope according to claim 4, wherein said A/D converting section further includes a variable amplifier circuit for variably amplifying said servo voltage from said servo circuit.

6. The microscope according to claim 5, wherein said variable amplifier circuit includes an analog multiplexer for outputting a voltage signal corresponding to the selected signal from said control means in response to said servo voltage and an inverting type amplifier for inverting and amplifying the voltage signal from said analog multiplexer.

7. The microscope according to claim 1, wherein said control circuit includes a modulation pattern generating circuit for generating modulation pattern data for finely modulating the distance between said probe and said sample, and the correction signal from said correction signal generating mean is controlled according to the modulation pattern data.

8. The microscope according to claim 1, wherein said correction voltage generating means includes D/A converter for converting digital data from said control means to an analog correction voltage.

9. The microscope according to claim 2, further comprising a high voltage amplifier circuit for amplifying an output from said approach detection/instantaneous contraction circuit to a high voltage.

10. The microscope according to claim 1, further comprising a scanning circuit for scanning said probe along said sample, said scanning circuit including means for causing said probe to scan at least a first scanning range corresponding to a portion of said sample to be observed and a second scanning range including the first scanning range and setting the size of said first scanning range; and adding means for adding output data from said setting means and data relating to a reference position of said first scanning range, corresponding to a reference position of said second scanning range, to each other in a digital manner.

11. The microscope according to claim 10, wherein said setting means includes a counter circuit for effecting the count up/down operation according to a scanning starting signal from said control means and a bit shift circuit for shifting an output from said counter circuit by a desired number of bits to the least significant bit side according to scanning range setting data supplied from said control means.

12. The microscope according to claim 11, wherein said scanning circuit includes an upper digit side latch circuit for holding high-order bits of said reference data and a lower digit side latch circuit for holding low-order bits thereof, and said adding means includes an upper digit side adder for adding high-order bits output from said upper digit side latch circuit and high-order bits output from said bit shift circuit to each other, and a lower digit side adder for adding low-order bits output from said lower digit side latch circuit and low-order bits output from said bit shift circuit to each other.

* * * * *